United States Patent [19]
Howard et al.

[11] Patent Number: 6,035,662
[45] Date of Patent: Mar. 14, 2000

[54] METHOD AND APPARATUS FOR ENHANCING CARBON DIOXIDE RECOVERY

[75] Inventors: Henry Edward Howard, Grand Island, N.Y.; Claudio Bruno Capurro, Pilar-Buenos Aires, Argentina

[73] Assignee: Praxair Technology, Inc., Danbury, Conn.

[21] Appl. No.: 09/170,012

[22] Filed: Oct. 13, 1998

[51] Int. Cl.[7] .................................................. F25J 3/00

[52] U.S. Cl. ................................... 62/617; 62/928

[58] Field of Search ................................. 62/617, 928

[56] References Cited

U.S. PATENT DOCUMENTS

| | | | |
|---|---|---|---|
| 4,384,875 | 5/1983 | Batteux et al. | 62/928 |
| 4,602,477 | 7/1986 | Lucadamo | 62/24 |
| 4,639,257 | 1/1987 | Duckett et al. | 55/16 |
| 4,770,683 | 9/1988 | Stothers | 62/25 |
| 4,936,887 | 6/1990 | Waldo et al. | 62/24 |
| 4,952,223 | 8/1990 | Kirshnamurthy et al. | 62/18 |
| 4,977,745 | 12/1990 | Heichberger | 62/10 |
| 5,927,103 | 7/1999 | Howard | 62/620 |

*Primary Examiner*—William Doerrler
*Attorney, Agent, or Firm*—Donald T. Black

[57] ABSTRACT

A process and an apparatus for producing substantially pure carbon dioxide from a carbon dioxide feed containing from about 80% to about 95% volume of carbon dioxide.

20 Claims, 1 Drawing Sheet

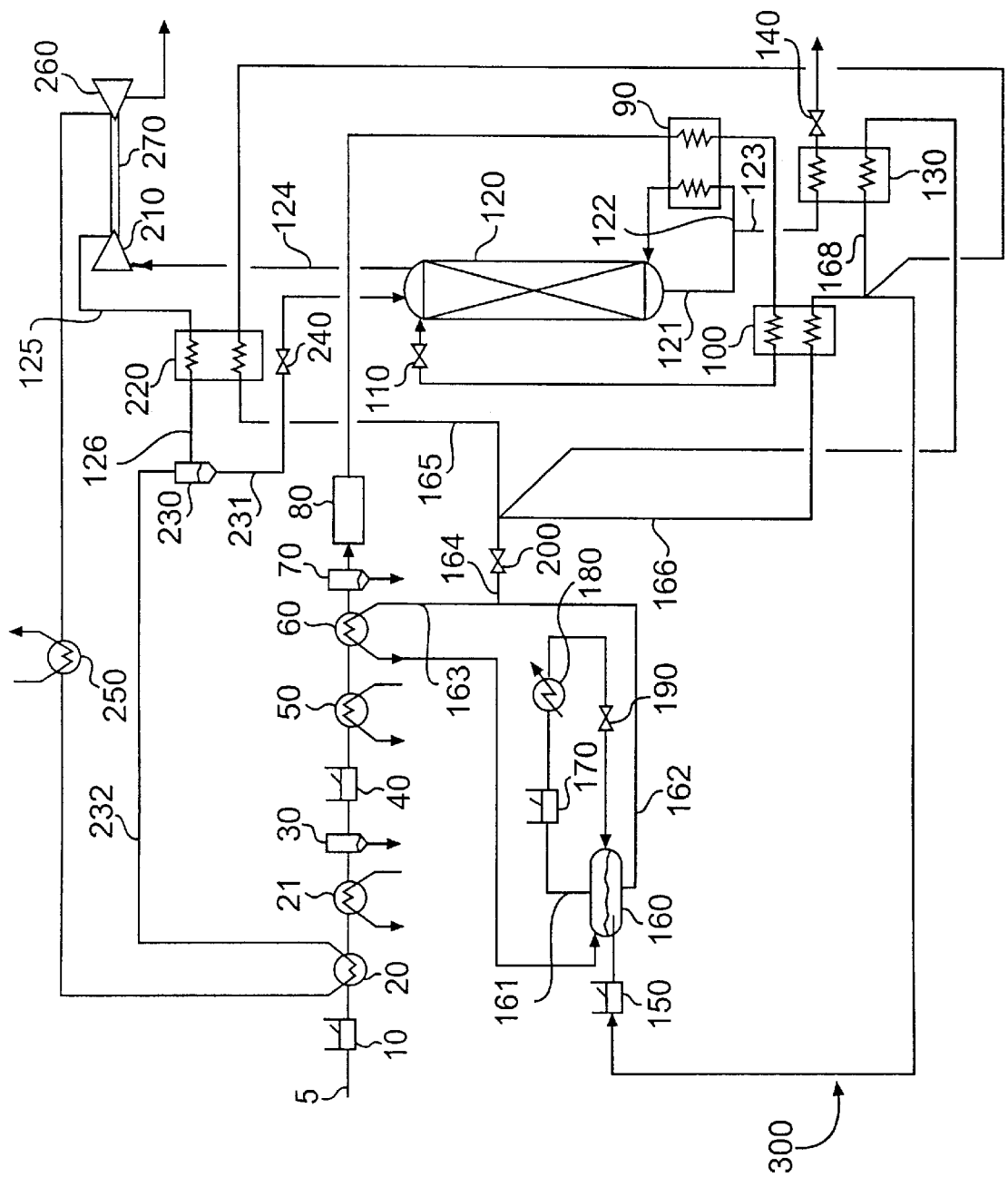

METHOD AND APPARATUS FOR ENHANCING CARBON DIOXIDE RECOVERY

FIELD OF THE INVENTION

This invention generally relates to increasing the recovery of carbon dioxide from conventional liquefaction and distillation arrangements, and more particularly, relates to increasing the carbon dioxide recovery from a distillation column of a carbon dioxide liquefaction plant by the use of a carbon dioxide vent compressor to increase vent pressure prior to condensation and residual vent expansion.

BACKGROUND OF THE INVENTION

Carbon dioxide is conventionally obtained as a gaseous by-product from the production of ammonia or hydrogen as well as from fermentation plants. It is known to convert the gaseous by-product into pure liquid carbon dioxide by distillation at recoveries exceeding 94% by weight.

Conventional distillation columns used for producing liquid carbon dioxide typically operate at a pressure of about 260 psia and a column condenser temperature of about –25° F. The waste gas removed from the top of the column as an overhead stream, under these conditions, contains about 75% by volume of carbon dioxide. Accordingly, the amount of carbon dioxide lost as waste is about triple the amount of impurities in the feed. It therefore follows that carbon dioxide recovery decreases significantly as the concentration of carbon dioxide in the feed decreases.

The decreasing availability of carbon dioxide feedstocks of moderately high purity (e.g., in excess of 98% carbon dioxide, dry basis) has forced the development of techniques and plant modifications to effectively recover and liquefy streams containing substantially higher levels of non-condensible impurities. When substantial fractions of light contaminants are present in the feed stream to a carbon dioxide liquefaction plant, the quantity of carbon dioxide that can be effectively condensed and purified declines due to the dewpoint suppression/reduction of the feed/vent stream. FIGS. 1 and 2 of U.S. Pat. No. 4,639,257 (the '257 patent) graphically depict this dewpoint suppression effect, in which, if a gas mixture contains less than the equilibrium concentration of carbon dioxide at the freezing temperature of the mixture concerned, then the carbon dioxide cannot be separated by cooling and partial condensation or by cooling and distillation, since the carbon dioxide will freeze before any liquid is formed. Simply reducing the primary condensation temperature of the refrigerant (such as ammonia) in order to increase the carbon dioxide recovery in such a situation often leads to undesirable equipment complications and thermodynamic performance inefficiencies. In conjunction with such difficulties, modifying the carbon dioxide refrigeration device still does not address the lost work contained within the high pressure/residual carbon dioxide vent stream.

Numerous attempts have been made to overcome the above-described problem. The first and most direct means to reduce the carbon dioxide lost in the overhead vent stream of a carbon dioxide plant is simply to reduce the temperature at which the vent stream is condensed. As the vent temperature is reduced, the fraction of carbon dioxide condensed and recovered is increased. In order to generate lower vent condensation temperatures, refrigerants such as carbon dioxide or ammonia at sub-ambient pressures must be used to absorb the cold condensing duty. As a natural consequence of the thermodynamic limitations of the saturation temperature of ammonia, however, increasing the column pressure level is often the only available process variable that can be maximized for power maximization. But, increased column pressure is accompanied by a substantial increase in the pressure energy losses associated with the process vent. Notwithstanding their drawbacks, however, these options have been commercially utilized and are essentially industry standards for increasing carbon dioxide recovery from existing plants.

More recent processes have been proposed, which increase carbon dioxide recovery from vent streams by utilizing membrane and/or adsorption units. In the membrane arrangements, the carbon dioxide vent stream is subjected to a membrane that preferentially diffuses carbon dioxide. The permeate stream/carbon dioxide enriched stream is then reintroduced into the feed compression train in which the recycled carbon dioxide is condensed and recovered. Such hybrid membrane processes have been disclosed in the '257 patent as well as in U.S. Pat. Nos. 4,602,477 and 4,936,887. Analogously, adsorption systems have been proposed with similar objectives. In these arrangements, carbon dioxide preferentially adsorbs onto an adsorbent. The adsorbent vessel is then depressurized and/or the carbon dioxide enriched desorbing stream is extracted and reintroduced into the feed compression and condensation train. The waste stream from a distillation column is processed in a pressure swing adsorption apparatus to produce a highly concentrated carbon dioxide stream that is recycled to the carbon dioxide feed. U.S. Pat. No. 4,952,223 shows an example of a pressure swing adsorption (PSA) vent processing apparatus, in which pure liquid carbon dioxide is produced from low concentration carbon dioxide feeds, particularly feeds having a concentration of carbon dioxide of from about 35% to about 98% by volume.

As indicated, there are a number of hybrid processes that increase vent carbon dioxide recovery via diffusion (membranes) and/or adsorption (PSA/VPSA). In general, these processes are substantially different from the present invention in both operation and requisite equipment. A comparison of the performance of these hybrid processes to the present invention indicates that these arrangements have several associated disadvantages. The performance of membranes and pressure swing adsorption units for increasing vent carbon dioxide content is inferior to that achievable via partial condensation and/or distillation, as in the present invention. More importantly, membranes and pressure swing adsorption units do not mitigate the pressure energy losses of the residual vent stream. In addition, both membranes and pressure swing adsorption units sacrifice vent pressure energy. In effect, both processes substantially reduce the pressure of the enriched, recycle carbon dioxide stream (raffinate/desorbate). Further, since the recycle stream will be of a lower pressure, both hybrid processes have to incorporate either an additional recycle compressor or provide for an incremental feed compressor size increase.

Another technique proposed for reducing vent losses does not focus not upon recovering additional carbon dioxide. In contrast, this process recovers the pressure energy contained within the carbon dioxide vent stream. Most carbon dioxide liquefaction/distillation arrangements operate at substantially super-atmospheric pressures (e.g., in excess of about 20 atm). As a consequence, any non-condensibles and uncondensed carbon dioxide will naturally exit the distillation/condensation process at such a pressure. Typically, no attempt or provision is made to recover the contained vent pressure energy. However, as contaminant levels increase, so does the flowrate of the vent stream and the lost pressure energy. The most direct means to recover this pressure energy is by the use of an auxiliary turbo-expansion. In effect, the vent stream is warmed and expanded with the concomitant recovery of the shaft work of expansion. This option avoids the inefficient throttling of the vent stream and can save substantial amounts of power. U.S. Pat. No. 4,977,745 (the '745 patent) discloses such an arrangement.

In summary, the past attempts to reduce carbon dioxide vent losses have been primarily focused upon increasing either (i) carbon dioxide recovery or (ii) vent pressure energy recovery.

SUMMARY OF THE INVENTION

The present invention provides for increasing both carbon dioxide recovery and vent pressure recovery, simultaneously. In this regard, the present invention pays particular attention to maximizing the otherwise lost pressure energy of the residual vent stream. The present invention is particularly effective for liquefaction and distillation plants that process carbon dioxide vent streams that contain in excess of 5% light contaminants (e.g., $N_2$, $O_2$, Ar, $CH_4$, $H_2$ and CO).

Relative to the conventional, enhanced cold condensation techniques employing reduced pressure carbon dioxide or vacuum ammonia, the present invention offers an alternative to enhanced carbon dioxide recovery. These previous processes subjected the vent stream to direct condensation after exiting the column (or after preliminary vent condensation). In effect, the vent pressure is maintained to be that of the column. In contrast, the present invention provides for the compression of the vent stream to a pressure in excess of the column pressure. This increase in vent pressure forces an increase in the dewpoint of the vent stream. This allows a greater portion of the carbon dioxide contained in the vent to be condensed for any given temperature level. As a consequence, the product recovery of the present invention will naturally be higher than these past processes.

The highlighted vent post-expansion process effectively recovers the pressure energy of the vent stream. However, often times, the value of the carbon dioxide contained in the expansion stream is sufficient to warrant recovery rather than discharge as low pressure waste. Again, the preferred embodiment of the present invention increases carbon dioxide recovery by vent compression, thus allowing additional carbon dioxide condensation/recovery prior to residual vent post-expansion. A primary distinction between the present invention and the arrangement in the '745 patent is that, in this invention, the vent is first compressed prior to expansion and condensation, rather than being directly expanded from the separation process, as disclosed previously.

Generally speaking, in the present invention, a vent stream exiting a carbon dioxide distillation column in a liquefaction process is first compressed to an elevated pressure. The pressurized vent stream is then subjected to heat exchange by being partially condensed against boiling refrigerant liquid. The partially liquefied vent stream is phase separated with the liquid portion returned to the distillation column for recovery, and the residual vent stream is then subjected to at least one stage of turbo-expansion with the production of useful shaft work. The present invention, then, provides a process and an apparatus for producing substantially pure carbon dioxide from a carbon dioxide feed containing from about 80% to about 98% by volume of carbon dioxide as the gas is fed to the plant, and about 80% to about 50% by volume of carbon dioxide as the gas is fed to the vent. The carbon dioxide feed is distilled in a distillation column thereby to form a liquid product containing substantially pure carbon dioxide and an overhead vapor stream containing carbon dioxide. The overhead vapor stream is compressed in a compression stage to form a compressed stream, the overhead vapor stream being compressed to a pressure sufficient to allow a substantial portion of carbon dioxide contained in the overhead vapor stream to be condensed. The compressed stream is cooled in a heat exchanger into a cooled stream, to cool and partially condense the compressed stream. The cooled stream is phase separated in a phase separator into a condensate liquid and a residual vapor. The condensate liquid is returned to the distillation column for further distillation.

In a preferred embodiment, the heat exchange step comprises at least one stage of condensation and phase separation. The separated liquid is recycled to the distillation column for further purification and recovery, and the remaining gaseous portion of the vent stream is subsequently warmed and turbo-expanded. Alternatively, the heat exchange step can be comprised of at least one warming heat exchange stage prior to direct turbo-expansion. In another preferred embodiment, the shaft work of the expansion provides the energy necessary for the vent compression.

The overhead vapor stream can be compressed to a pressure of about 350 psia to about 900 psia. Also, the compressed stream can be cooled in the heat exchanger utilizing moderate pressure/chilled refrigerant provided from a separate refrigeration system. The cooling of the compressed stream can be to a temperature of about −25° F. to about −65° F.

The carbon dioxide feed can be compressed, dried and cooled prior to being distilled in the distillation column. In this regard, the dried feed can be cooled to near its dew point in a column reboiler. Then, the cooled, dried feed can be substantially condensed against low pressure refrigerant in a condenser prior to being distilled in the distillation column. The low pressure refrigerant in the condenser can be provided from a separate refrigeration system.

The distillation in the distillation column can be conducted at a temperature of from about −10° F. to about −50° F. and a pressure of from about 260 psia to about 340 psia.

Generally, by using the concepts of the present invention, we have found that the recovery of the carbon dioxide can exceed about 95% by weight.

DESCRIPTION OF THE DRAWINGS

The FIGURE schematically shows a preferred embodiment of the present invention for enhancing carbon dioxide recovery in a carbon dioxide liquefaction and distillation plant.

DETAILED DESCRIPTION OF THE PREFERRED EMBODIMENTS

The FIGURE schematically depicts a preferred embodiment of the present invention. For convenience of explanation, this invention is illustrated in the context of a conventional single column carbon dioxide distillation arrangement with an accompanying two stage refrigeration unit. Of course, one having ordinary skill in the art recognizes that this invention is not limited to this particular arrangement.

In the FIGURE, raw feed gas 5 containing substantially about 80% to about 98% carbon dioxide, smaller quantities (on the order of about 5% or more) of lower boiling contaminants (such as $N_2$, $O_2$, Ar, $H_2$, CO and $CH_4$) and moisture is compressed in compressor 10 from near atmospheric pressure to about 60 psia to about 90 psia. The compressed stream is then cooled within heat exchanger 20 and water cooled exchanger 21, consecutively, to a temperature of about 80° F. to about 100° F. Any condensed moisture is separated and withdrawn in phase separator/vessel 30. The dried feed stream is typically further compressed to an elevated pressure of about 280 psia to at least about 325 psia in compressor 40. After compression in compressor 40, the feed stream is further cooled against cooling water and chilled refrigerant in heat exchangers 50 and 60, consecutively, to a temperature of about 35° F. to about 45° F. The feed stream is again freed of condensed moisture in separator vessel 70. The dried stream is further dried by an adsorbent system 80. By way of example, adsorbent system 80 may be an adsorbent bed of alumina. Although not shown, carbon adsorption beds also can be used to extract any higher boiling hydrocarbons.

The clean and dried feed stream is then further cooled to near its dewpoint within column reboiler 90. This temperature is from about 0° F. to about 10° F., depending on the composition of the stream. The feed stream is then substantially condensed against low pressure refrigerant in primary condenser 100. The feed stream is then flashed through valve 110 into a point near the top of distillation column 120 where it serves as a primary feed. Carbon dioxide is stripped from the liquid within column 120. Column 120 operates at a temperature of about −25° F. to about −5° F. and a pressure of about 270 psia to about 320 psia. Liquid carbon dioxide, which is essentially pure, is collected from the base of column 120 in line 121 and a portion of this stream, in line 122, is partially vaporized in column reboiler 90, the vapor thus generated serving as stripping vapor for column 120. The remaining portion of the liquid carbon dioxide, in line 123, is subcooled to a temperature of about −25° F. to about −15° F. within heat exchanger 130 against low pressure refrigerant and flashed to storage through valve 140.

With reference to the refrigeration system, which is generally shown by reference numeral 300, a number of different refrigerants can be used to supply the cooling and condensing duties indicated above. Among the possible refrigerants that can be used are R22 (chlorodifluoromethane), R717 (ammonia) and R290 (propane). Other refrigerants having the desired thermodynamic properties also can be used as desired. Cold, gaseous refrigerant, preferably ammonia, is compressed from a low pressure within compressor 150 to a pressure of about 70 psia to about 85 psia and directed into direct contact aftercooler 160. Gaseous, moderate pressure refrigerant is extracted from the top of aftercooler 160 in line 161 and further compressed within compressor 170 to a pressure of about 200 psia to about 220 psia. High pressure refrigerant is then substantially condensed within heat exchanger 180, which may be cooled by water, forced air or the like. The liquefied refrigerant is then reduced in pressure through valve 190 to a pressure of about 70 psia to about 85 psia and introduced into direct contact aftercooler 160 as the cooling medium.

A stream of moderate pressure/chilled refrigerant at a pressure of about 70 psia to about 85 psia is extracted in line 162 from the bottom of aftercooler 160. A portion of this stream, in line 163, is used to chill the feed stream within heat exchanger 60. An additional portion of this stream is separated in line 164 and further reduced in pressure through valve 200 to a pressure of about 14 psia to about 20 psia. A portion of this pressurized stream, in line 166, absorbs the heat of condensation within primary feed condenser 100 and, in line 168, the product subcooling duty of heat exchanger 130. An additional portion, in line 165, serves to condense a portion of the overhead vent stream from distillation column 120, which will be described in greater detail below. The vaporized low pressure streams are recombined and compressed in compressor 150 of refrigeration system 300, as noted above.

Overhead vapor 124 exiting column 120 is compressed in compressor 210 to a pressure sufficient to allow a substantial portion of the contained carbon dioxide to be condensed within heat exchanger 220. This pressure, in excess of the column pressure, is on the order of about 350 to about 900 psia. The compressed stream, in line 125, is partially condensed in heat exchanger 220. The partially condensed stream, in line 126, is phase separated in vessel 230. The condensate liquid in line 231 is then flashed through valve 240 and returned into the upper portion of column 120. The residual vapor exiting phase separator 230, in line 232, is warmed by passage through heat exchanger 20 and, if desired, waste heat exchanger 250 to an elevated temperature suitable for expansion within turbo-expander 260. This temperature is on the order of about 160° F. to about 350° F. The shaft work developed by turbo-expander 260 can be directly imparted to compression stage in compressor 210 via shaft/spindle 270.

The intent of this invention is to provide a way to increase the carbon dioxide production from typical carbon dioxide plant vent streams. This invention need not be limited to the specific configuration shown in the FIGURE.

As described above, after vent compression in compressor 210, a condensation step can be utilized to further condense out carbon dioxide from the vent stream. Options to this base step include the use of multiple refrigeration levels as well as the use of multiple refrigerants (e.g., ammonia and carbon dioxide). The pressure at which this condensation step occurs (or at which these condensation steps occur) are arbitrary and need not be solely defined by the shaft work obtainable from turbo-expander 260.

Also, separate, externally powered compression stages in compressor 210 can be added to allow further condensation of the carbon dioxide. If necessary, the heat of compression can be rejected into an additional heat exchanger (just prior to heat exchanger 220) in order to reduce the condensing load on the cold refrigerant.

As a further alternative, the liquid feed streams to column 120 (i.e., those passing through valves 110 and 240, respectively), need not be fed to the same column location, if they are of disparately different temperatures. In such an arrangement, by way of example, a separate column section can be placed between the two feed locations.

It should be noted that, although not shown in the FIGURE, many plants have an integral reflux condenser attached to the top of column 120. In effect, direct vent condensation (at column pressure) is already performed. The present invention is applicable to this type of arrangement as well, since this invention can be applied to a vent stream exiting either the column 120 or an existing vent condenser. This invention will derive a greater product flow of carbon dioxide regardless of the configuration.

The shaft work resulting from the residual vent turbo-expander 260 can be coupled directly to compression stage 210 (as shown in the FIGURE), to a generator for the production of electricity, or simply expended in a braking fluid. The warming of the expander feed stream need not be done in the fashion shown the FIGURE. Rather, any available compression or process heating medium/stream can be used to increase the resultant shaft work by increasing the inlet temperature of expansion.

The synergistic effects of a substantially higher head pressure combined with a direct utilization of power expansion shaft work yield a very low power process. In addition to the power reduction, the present invention is capable of a substantial increase in product carbon dioxide due to the inclusion of the condenser/separator. In effect, the composite process improves the efficacy of both components.

The FIGURE shows an optional waste heat exchanger 250. This, of course, assumes that external waste heat is available. This need not be the case in order to apply the present invention. In addition, turbo-expander 260 can be comprised of successive expansion stages to extract the maximum potential energy out of the stream. In such an arrangement, the vent stream would be re-heated and expanded several times.

The FIGURE shows, for discussion purposes, piston/reciprocating type compressors and counter flow heat exchangers. These components are not limited to these particular types. Rather, the compressors shown can be replaced by other types such as dry/oil screw compressors or centrifugal turbo-machines. Similarly, the heat exchangers can be of the shell and tube, tube in tube, plate and frame or plate and fin type heat exchangers.

The various components shown in outline or in block form in the FIGURE are individually well known and their internal construction and operation are not critical either to the making or using of this invention or to a description of the best mode of the invention.

While the present invention has been described with respect to what is considered to be the preferred embodiments, the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A process for producing substantially pure carbon dioxide from a carbon dioxide feed containing from about 80 percent to about 98 percent by volume of carbon dioxide, said process comprising:
   a) distilling the carbon dioxide feed in a distillation column thereby to form a liquid product containing substantially pure carbon dioxide and an overhead vapor stream containing carbon dioxide;
   b) compressing the overhead vapor stream in a compression stage to form a compressed stream, the overhead vapor stream being compressed to a pressure sufficient to allow a substantial portion of carbon dioxide contained in the overhead vapor stream to be condensed;
   c) cooling the compressed stream in a heat exchanger into a cooled stream, to cool and partially condense the compressed stream;
   d) phase separating the cooled stream in a phase separator into a condensate liquid and a residual vapor; and
   e) returning the condensate liquid to the distillation column to be distilled further in said distilling step.

2. The process of claim 1 further comprising warming the residual vapor exiting the phase separator in at least one heat exchanger.

3. The process of claim 2 wherein said warming step comprises warming the residual vapor to a temperature of about 150° F. to about 350° F.

4. The process of claim 2 further comprising feeding the residual vapor warmed in said warming step to a turbo-expander and expanding the warmed residual vapor in the turbo-expander to produce shaft work.

5. The process of claim 4 further comprising imparting the shaft work produced by the turbo-expander to the compression stage to assist in compressing the overhead vapor stream in said compressing step.

6. The process of claim 1 wherein said compressing step comprises compressing the overhead vapor stream to form the compressed stream at a pressure of about 350 psia to about 900 psia.

7. The process of claim 1 wherein said cooling step comprises cooling the compressed stream in the heat exchanger utilizing moderate pressure/chilled refrigerant provided from a separate refrigeration system.

8. The process of claim 7 wherein said cooling step comprises cooling the compressed stream to a temperature of about −25° F. to about −65° F.

9. The process of claim 1 further comprising compressing the carbon dioxide feed, drying the compressed feed and cooling the dried feed prior to distilling the carbon dioxide feed.

10. The process of claim 9 wherein the dried feed is cooled to near its dewpoint in a column reboiler, and further comprising substantially condensing the cooled, dried feed against low pressure refrigerant in a condenser prior to being distilled in said distilling step.

11. The process of claim 1 wherein said distilling step is conducted at a temperature of from about −10° F. to about −50° F. and a pressure of from about 260 psia to about 340 psia.

12. An apparatus for producing substantially pure carbon dioxide from a carbon dioxide feed containing from about 80 percent to about 98 percent by volume of carbon dioxide, said apparatus comprising:
   a) a distillation column for distilling the carbon dioxide feed thereby to form a liquid product containing substantially pure carbon dioxide and an overhead vapor stream containing carbon dioxide;
   b) a compression stage for compressing the overhead vapor stream to form a compressed stream, the overhead vapor stream being compressed to a pressure sufficient to allow a substantial portion of carbon dioxide contained in the overhead vapor stream to be condensed;
   c) a heat exchanger for cooling the compressed stream to cool and partially condense the compressed stream into a cooled stream;
   d) a phase separator for phase separating the cooled stream into a condensate liquid and a residual vapor; and
   e) a return line for returning the condensate liquid to said distillation column for further distillation.

13. The apparatus of claim 12 further comprising at least one heat exchanger for warming the residual vapor exiting the phase separator.

14. The apparatus of claim 13 wherein the residual vapor is warmed in said at least one heat exchanger to a temperature of about 150° F. to about 350° F.

15. The apparatus of claim 13 further comprising a turbo-expander for receiving the warmed, residual vapor and for expanding the warmed residual vapor to produce shaft work.

16. The apparatus of claim 15 further comprising a shaft connecting said turbo-expander to said compression stage for imparting the shaft work produced by the turbo-expander to the compression stage to assist in compressing the overhead vapor stream.

17. The apparatus of claim 12 wherein said compression stage compresses the overhead vapor stream to form a compressed stream at a pressure of about 350 psia to about 900 psia.

18. The apparatus of claim 12 wherein said heat exchanger cools the compressed stream utilizing moderate pressure/chilled refrigerant provided from a separate refrigeration system.

19. The apparatus of claim 12 further comprising at least one compressor for compressing the carbon dioxide feed, at least one dryer for drying the compressed feed and at least one heat exchanger for cooling the dried feed prior to the carbon dioxide feed being distilled in said distillation column.

20. The apparatus of claim 12 wherein said distillation column conducts the distillation at a temperature of from about $-10°$ F. to about $-50°$ F. and a pressure of from about 260 psia to about 340 psia.

* * * * *